United States Patent Office 3,425,896
Patented Feb. 4, 1969

3,425,896
STARCH COATING INSOLUBILIZED WITH
A ZIRCONIUM SALT
Robert T. Hart, Rumford, Maine, assignor to Oxford Paper Company, New York, N.Y., a corporation of Maine
No Drawing. Continuation-in-part of application Ser. No. 262,259, Mar. 1, 1963, which is a continuation-in-part of application Ser. No. 61,061, Oct. 7, 1960. This application Nov. 21, 1966, Ser. No. 595,655
U.S. Cl. 161—266          9 Claims
Int. Cl. B32b 23/14

ABSTRACT OF THE DISCLOSURE

Coating compositions containing starch which is free of carboxyl groups in which the starch is insolubilized with a water-soluble zirconium salt by forming preferred coordinate covalent bonds with the free electron pairs of the oxygen atoms of the starch hydroxyl groups.

---

This is a continuation-in-part of my application Ser. No. 262,259, filed Mar. 1, 1963, which is in turn a continuation-in-part of my application Ser. No. 61,061, filed Oct. 7, 1960, both now abandoned.

This invention relates to insolubilization of starch which is substantially free of carboxyl groups and to practical applications thereof. In one of its preferred applications the invention relates more particularly to the production, by practical means, of a pigmented starch coating for paper and paperboard that exhibits an excellent degree of insolubilization. In another preferred application, the invention relates to the production, by practical means, of starch adhesives that become insoluble after their application as adhesives in the lamination of paper and paperboard.

It will be most advantageous as an aid to understanding the novelty, scope, and utility of this invention to describe briefly the present state of the art of adhesives commonly employed as binders in the production of pigment coated papers and paperboards.

Primarily, the chief types of binders used today for paper coatings are starch, casein, soy protein, styrene-butadiene latices, acrylic latices, and polyvinyl alcohol. Of these the relative consumption on a dry basis of the three leading adhesive types is 120 million pounds of starch, 35 million pounds of casein, and approximately 20 million pounds of latices of all types. Economically, starch is the preferred choice because of its relatively low cost. Total corn starch products consumed by the paper industry in the year 1955 for all purposes including laminating and corrugating was in the neighborhood of 700 million pounds.

Corn, potato and tapioca are examples of three varieties of starch commonly used as adhesives and by the paper industry. All of these starches are available as common, raw, or unmodified starches. In order to use such common starches as adhesives or in coating compositions they must be dispersed in water. Cooking of such starch suspensions causes some degeneration of the starch particles resulting in improved stability and reduce viscosity. Even when cooked such starch solutions are still highly viscous at solids concentrations as low as 3 to 4% and have a marked tendency to congeal and retrograde resulting in gel-like masses that have none of the flow properties required of a coating composition. Such starch cooks are thus modified by known techniques which modifies the viscosity and coating characteristics of the solutions so they can be used as an adhesive especially for the pigment coating of paper. This modification is generally accomplished by the well-known enzyme conversion of common starches. Such starches are commonly referred to in the art as enzyme converted starch. Other methods of modifying cooked starch in order to increase the solubility thereof in water as well as to reduce viscosity are also known to those skilled in the art and include the hydroxyethylation of starch, and the acetylation of starch. Such modified starches are referred to as hydroxyethylated starch and acetylated starch.

The term starch as used herein means starches which are modified to permit the preparation of aqueous solutions thereof having a solids content in excess of that normally obtainable with starches which have only been cooked, i.e., in excess of about 12% by weight solids but usually less than 40% by weight solids, and which starches are substantially free of carboxyl groups. Starches coming within the above definition include the enzyme converted starches, the hydroxyethylated starches and the acetylated starches referred to above.

Unfortunately, starch adhesives possess one major drawback, namely, lack of resistance to water. Starch is an amylaceous, long chain material bearing many hydroxyl groups which show a tendency to associate with hydrophilic solvents such as water. A dried, pigmented starch coating tends, upon remoistening, to soften and lose its integrity so that the coated surface tends to "pick" on the blanket of the offset press. Thus, recourse has, of necessity, been made to the more water-resistant, but more expensive, adhesives such as casein and latices for many purposes for which starch adhesives would otherwise have been preferred. Some of these uses are for lithographic and offset printing, labels, wallpaper and board, posters, containers and folding cartons, all of which require a degree of insolubilization (or wet-rub resistance) not demonstrated by conventional starch coatings.

The problem of conferring upon starch adhesives an adequate degree of insolubilization has become a classic one within the coated paper industry and one upon which much effort has been expended with varying degrees of lack of success. Of the methods which have been proposed relatively few have been adopted commercially, and even these have not been widely used because the degree of insolubilization, or wet-rub, attained has not been sufficiently great to overcome the sensitivity of the starch film to water.

As pointed out by Black[1] in his excellent Monograph on Water Resistant Starch Coatings, attacks upon the problem have been directed along three general avenues:

(1) The addition of water-resistant materials in admixture with starch adhesives to produce a mixed film exhibiting water resistance in proportion to the relative percentage of the so-included component. Unfortunately, this requires so large an amount of the water-resistant material to overcome the extreme water sensitivity of the starch that the starch is likely to become the minor ingredient.

(2) Another approach has been to incorporate in the starch adhesive certain water-repellant materials to reduce the wetability (and thus prevent disintegration) of the starch or pigment-starch combinations. Again, this has not proven generally successful due to the introduction of undesirable side effects such as loss of brightness and large increases in viscosity.

(3) The addition of materials which combine chemically with the starch molecule either through cross-linking between adjacent starch molecules or by attachment to hydrophilic groups on the starch molecule. In the former case it is thought that there is formed a new cross-linked molecular structure enough to resist the deleterious action of water, while in the latter case, it is thought that such blocking of the hydrophilic groups causes them to be unavailable for association with water.

---
[1] W. C. Black, chap. XIV, Tappi Monograph Series, No. 17 (1957), Mack Printing Co., Easton, Pa.

As examples of the former type, a number of aldehyde resins such as urea-formaldehyde and melamine-formaldehyde resins have been widely used to insolubilize a variety of starch adhesives. The disadvantages of this type of insolubilization mechanism are: necessity of using fairly large amounts of the resin; insufficient wet-rub development; the need to include acidic catalysts or accelerators for curing of the resin-starch adduct; the requirement of considerable heat and/or time to effect the cure; and, above all, the causing of possible undesirable large increases in viscosity of the coating color, making said coatings unsuitable for trouble-free running on existing coating machines. This is particularly an affliction in the field of high solids, on-the-machine coating colors where much of the starch for coating purposes is consumed. Nevertheless, in spite of all these disadvantages, this system of developing wet-rub is prevalent in the coated paper and paperboard industry today simply because it has been the best method available until now.

As examples of blocking of hydrophilic groups by attachment, certain multivalent-metal salts such as chromium and antimony have been found to be more or less effective in certain instances for insolubilizing starch films. From 5 to 10% of potassium pyro antimonate has been suggested for this purpose. Still, the method of insolubilization with metal salts has received practically no acceptance at all because of numerous practical difficulties among which are: bad color, high expense, excessive curing conditions necessary, incompatibility with other components of coating colors, excessive viscosity increases at high percent solids, and others. Therefore, whatever the mechanism by which varying degrees of insolubilization have been achieved, in no case of which I am aware has a really satisfactory method been developed to attain the desired degree of insolubilization of the starch film or a pigmented starch coating, within the practical operating limits of today's laminating and coating machines, until the discovery of my novel methods described hereinafter.

My invention involves the discovery that various ionic forms of zirconium precipitate starch solutions in the form of more or less rigid gels, depending of course upon the usual variants of concentration of reactants, etc. These rigid starch gels upon subsequent drying proved to be quite insoluble and resistant to the action of water in contrast to the state of extreme solubility of other portions of the same starch solutions that had not been so treated. When an untreated starch solution was intimately mixed with a pigment slurry, such as a suspension in water of fine particle size domestic clay, in ratios commonly employed in the art of coating paper and the mixture then treated with a zirconium salt, a thick viscous, but apparently homogeneous mass was produced that upon application in a thin film to a paper base with a doctoring blade and upon subsequent drying in an oven yielded a dry, pigmented starch paper coating that possessed exceptionally good resistance to water quite superior to the inadequate wet-rub resulting from the employment of the aforementioned aldehyde resin class of materials. Particularly effective in exemplifying the action just described were such ionic forms as zirconium tetrachloride, zirconyl acetate, zirconyl nitrate and zirconyl chloride. Yet, with certain exceptions to be noted later, this discovery was severely limited in its practical application to the art of coating paper and paperboard, because the concomitant high viscosities so produced in the coating color caused the aforesaid colors to be completely unsuitable for normal operations of the high-solids (55% solids and above) on-the-machine type of paper coating equipment commonly employed in the coating of paper. Although my discovery is useful in so-called low-solids (below about 50% solids) coating operations of the size-press and off-the-machine types, all as exemplified later, it became apparent that the discovery would require modification to be of practical utility in the area of high solids coating of paper and paperboard with pigmented starch coating compositions of the types normally employed in the art. Consequently, a large amount of further experimental study was devoted to discovering means of incorporating the potential insolubilizing materials within high solids coating colors without causing premature large increases in viscosity or without inflicting other harmful effects upon the normal rheological behavior characteristics that are necessary to the proper runability of a typical high solids coating color.

One such method investigated was the complexing (through chelation) of the polyvalent metal ionic forms as basic tartrates, lactates, citrates, and glycolates which, indeed, gave complete compatibility (no thickening or viscosity increases) within the coating color. Unfortunately, however, subsequent drying of the applied coating resulted in no production of the desired insolubility because the metal ions were still held securely within the complex. Even treatment of the mixture with acidic materials that lowered the pH of the mixture to a value of 2.0 or lower failed to release the insolubilizing materials from the inhibited inactive complexed state to an active state.

In any case, whatever the theoretical mechanisms involved, and I do not wish to be limited by such descriptions, it became apparent that the use of these materials in the operation of high-solids, on-the-machine coaters still had not been perfected because of the aforementioned difficulties, i.e., either premature reaction resulting in abnormally high viscosities at above about 40–55% total solids, or, alternatively, compatibility at above about 55% solids but only as a result of complete and permanent inhibition of the potential reactants from attaining an active state.

The importance of proper rheological characteristics of a coating color for high-speed application on the machine cannot be overemphasized because coatings having properties lying outside a characteristic but narrow range of flow behavior will be inoperable in the coating process. The field of study of flow characteristics of coatings is very complex in itself and a number of instruments and methods have been devised for the measurement and definition of flow properties. Any coating can be classified [2] as to type of flow behavior, whether Newtonian, plastic, pseudoplastic, thixotropic plastic, dilatant, and so on, and values can be obtained through the use of high shear viscometers for such specific properties as apparent viscosity, plastic viscosity, yield value, coefficient of thixotropy, and leveling index. Without going further into the intricacies of this complex field, the point to be made is that the inclusion of a potential insolubilizing agent, particularly of the metal ion form, which is likely to give fast reactions, cannot affect adversely any of the many basic rheological characteristics of the coating color, particularly at high solids, and be still suitable for practical use on current high-speed paper coating machinery.

Now, for the first time, I have discovered a metal salt combination which meets all the stringent practical operating requirements heretofore described yet produces an excellent degree of insolubilization in starch solutions treated with this agent. The starch forms include clear starch films for laminating purposes, clear or pigmented starch mixtures for low-solids or high-solids application of clear films or pigmented coatings, for on-the-machine coating or off-the-machine coating, including tub sizing, size press, and laminating operations. A preferred form of the insolubilizing agent is ammonium zirconyl carbonate, which exhibits none of the deleterious actions in regard to viscosity or other rheological characteristics referred to above when used with either high or low solids compositions but which, upon drying of the clear or pigmented starch films or coatings, imparts a degree of insolubilization, or wet-rub, not heretofore attainable by any of the methods now employed.

[2] Reference: Culp, chap. XI, Tappi Monograph No. 17.

The zirconium salts can be used to insolubilize starch films or coatings by incorporating the zirconium salt directly into the aqueous coating compositions containing the starch. The composition can then be applied to the surface desired such as paper, and dried, preferably with heat, to form the insolubilized starch film or coating. Starch films and coatings can also be insolubilized, according to this invention, by forming an aqueous coating composition containing starch as the primary adhesive and applying this composition, which contains no zirconium salts, to the desired base. The starch coating or film, after at least partial drying, can then be treated with the zirconium salt with a so-called "wash-coat" operation. This can be advantageously accomplished by running the starch coated base through a bath of the zirconium salt and then subsequently through a pair of rubber squeeze rolls to reject entrained excess insolubilizing solution. The moist coating containing the zirconium salt insolubilizing agent can then be dried in any conventional manner.

Ammonium zirconyl carbonate is very advantageous since it can be readily incorporated into coating compositions containing starch as the principal adhesive having a solids content less than about 55% by weight or in excess of 55% by weight. Ammonium zirconyl carbonate can also be used in the so-called wash-coat operation as previously discussed.

All of the other zirconium salts, including zirconyl chloride, zirconyl acetate, zirconyl nitrate and zirconium tetrachloride cannot be directly incorporated into aqueous starch coating compositions having high solids content. These zirconium salts cause a gelling action to take place resulting in abnormally high viscosities which render these coating compositions unsuitable for application by conventional types of coating equipment currently in use in the paper and paperboard industry. A possible exception to this might be in the application of such coatings by a trailing blade coater where a certain degree of "body" is desirable.

It is difficult to set any specific limits on the solids content of the starch coating compositions with respect to these zirconium salts other than ammonium zirconyl carbonate, since this will depend, to a great extent, upon the particular zirconium salt being used as well as other compositions and coating conditions involved, and so forth. Whether or not a particular zirconium salt other than ammonium zirconyl carbonate can be used directly in aqueous starch coating compositions of a particular solids content can, however, be readily determined by routine experimentation by those skilled in the art. It can generally be stated that these zirconium salts other than ammonium zirconyl carbonate cannot be successfully employed directly into aqueous coating starch compositions containing in excess of about 40–55% by weight. Zirconyl chloride, for example, has been directly incorporated into aqueous coating starch compositions containing approximately 52% solids by weight.

The acidity of some of these zirconium salts such as zirconyl chloride must also be taken into consideration when being used as the insolubilizing agent either directly into the coating composition or as a wash-coat and care must be taken to avoid discoloration or degradation of the paper coating base. Generally, the pH of aqueous solutions of starch and ammonium zirconyl carbonate are between 5 and 10 and one does not have to be concerned with discoloration or degradation of paper bases when this compound is used as an insolubilizing agent.

It will be apparent to those skilled in the art that by proper adjustment of the concentration of the ingredients, including the zirconium salts, to suit the viscosity-time-pressure requirements of a particular coating, laminating or corrugating mechanical process, many different formulations may be prepared to which metal ion forms of zirconium or zirconium salts can be adapted. Therefore, I do not wish to be limited to the particular descriptions cited in the examples.

As previously indicated not all zirconium salts are operative according to this invention. For example, the zirconium salt must be soluble in water thus eliminating such water insoluble salts as zirconium phosphate and hydrous carbonated zirconia. In addition, there are a few water soluble zirconium salts that are not operative such as zirconium glycolate, zirconium tartrate, zirconium lactate, and zirconium citrate. The reason for this is that the zirconium salts useful according to the invention must be capable of forming coordinates, covalent bonds between the free electron pairs of the oxygen atoms of the hydroxyl groups of the starch and the central zirconium atom in which the electron pair fits into the "outer octet" ring of zirconium. In the case of the zirconium glycolates, etc. there is no room for an electron pair from a hydroxyl group of starch to form a bond with the zirconium atom since this class of compounds are alpha-hydroxycarboxylic acids and the hydroxy group has already donated an electron pair to the zirconium atom to form an internal chelate ring making the formation of coordinate, covalent bonds between the starch and such zirconium salts impossible. The presence of carboxyl groups in a starch results in an entirely different reaction mechanism where the predominant reaction will be between the metal salt such as zirconium salts and the carboxyl group with little if any reaction between tthe metal salt and the starch hydroxyl groups. Thus, the only zirconium salts not operable are those which are water insoluble and those such as the carboxylic acid salts which are incapable of forming coordinate covalent bonds between the free electron pairs of the oxygen atoms of the starch hydroxyl group and the central zirconium atom. All other zirconium salts would to applicant's knowledge be operable to insolubilize starches containing hydroxyl groups and which are free of carboxyl groups.

It is obviously quite an economical advantage to be able to insolubilize conventional untreated or unmodified starches over the more expensive chemically modified starches such as chlorinated starches containing carboxyl groups.

Various other materials can be incorporated into the coating compositions of my invention as will be appreciated by those skilled in the art, including other adhesives or binders in addition to starch which are compatible therein such as butadiene-styrene latices.

Various pigments can also be used including clay, calcium carbonate, titanium dioxide, blanc fixe, satin white, and so forth. The pigment concentration can be varied widely and can be that commonly used in the coating industry.

The proportions of the various materials which can be used can readily be determined by those skilled in the art by routine experimentation, depending upon the particular properties desired in the coating formulation and final product.

For example, the amount of ammonium zirconyl carbonate used will be mainly determined by the degree of insolubilization desired in the final product. A sufficient amount should, of course, be used to impart some insolubilization to the resulting coating. As the amount of ammonium zirconyl carbonate is increased, the extent of insolubilization of the resulting film also generally increases.

The same is true with respect to the other ionizable zirconium salts disclosed herein such as zirconyl chloride; but since these ionizable salts also increase the viscosity of the coating composition, the amount used will not only depend upon the degree of insolubilization desired in the final product but upon the viscosity and solids content desired in the coating composition.

The term "free of carboxyl groups" is used herein to mean that the starch does not contain sufficient carboxyl groups to result in any significant reaction between the zirconium slats, such as ammonium zirconyl carbonate, and the carboxyl groups which will interfere with or significantly alter the complex reaction which occurs between the zirconium salt and the starch in the absence of carboxyl groups.

I have, with particular advantage, used for the purpose of my present invention, ammonium zirconyl carbonate produced by reacting zirconium oxychloride, in theoretical proportions, with ammonuim carbonate in aqueous solution containing a small amount of ammonium hydroxide, e.g., about 1% on the weight of the ammonium carbonate. This reaction may be readily accomplished simply by dumping zirconium oxychloride into a 20%–30% ammonium carbonate solution containing a small proportion of added 28% ammonia water, the reaction occuring immediately at room temperature. In addition to the ammonium zirconyl carbonate, the reaction results in the formation of ammonium chloride which is retained in the ammonium zirconyl carbonate.

I have found that the presence of ammonium chloride in the AZC used in insolubilizing these polymeric materials, in accordance with my present process, catalyzes the insolubilization reaction and materially shortens the curing time.

In place of the zirconium oxychloride, other soluble zirconium salts may be used; for instance, zirconium sulfate, but superior results have been obtained where the zirconium oxychloride is used, especially in view of the presence of ammonium chloride in the resulting AZC.

Instead of producing the ammonium chloride in the AZC-forming process, it may be subsequently added to the AZC or may be separately added to the polymeric material in catalytic proportions, for instance, amounts less than 10% of the AZC used. Its presence in the polymeric material does not cause premature gelling or precipitation of the polymer, but when included in compositions such as shown, for instance, in the foregoing examples, the curing time, at comparable temperature, is reduced by up to 50%.

In elucidating the full scope and practical utility of my invention, it will be helpful to present in detail practical operating examples as a guide for those who wish to follow the teaching of my novel discoveries.

EXAMPLE 1

Step 1.—12 units of an unmodified pearl corn starch were wetted with 28 units of water and enzyme converted in the conventional manner to yield a thin flowing solution of starch.

Step 2.—75 units of a fine particle coating clay and 25 units of a fine particle calcium carbonate were then mixed, step-wise, in a heavy-duty mixer with the dispersion of Step 1 and also with 28 units of water to provide a thick mixture or mass.

Step 3.—To the mixture of Step 2 there was added 13.2 units of a commercial aqueous synthetic latex containing 6.3 units of styrene-butadiene copolymer, as additional, nonamylaceous adhesive, and the whole coating composition mixed, additionally, for a period of five minutes in the heavy-duty mixer before being discharged therefrom to yield a smooth, homogeneous coating composition containing actual solids of 62.0% as determined.

Step 4.—The coating composition of Step 3 was applied at 700 feet per minute by means of a roll coater of the multiroll train-type to one side of a well-formed paper web of the type commonly used as base stock for the production of high quality coated paper. The air dry weight of the paper base stock was about 47 lbs. per TAPPI ream (25" x 38"/500). Sufficient wet coating composition was applied to the said side of the base stock to form a wet coating layer whose weight was about 9 lbs., dry weight, per ream. The so-coated paper web was then run over a series of internally heated drying cylinders until dry and the dried coated web wound upon the reel at the dry end of the machine.

Step 5.—The dried, coated paper of Step 4 was then passed through several nips of a supercalender to yield a high-quality coated paper hereinafter referred to as the Blank. The characteristics of this Blank coated paper may be described as follows:

G.E. brightness—79.2
Gloss—88.3%
Wet-rub—Oven-cured 5 minutes at 200° F., very poor; 9 days' aging at room temperature only, very poor

EXAMPLE 2

The procedure described in the foregoing Example 1 was repeated excepting only that there was premixed with the cooked starch solution before its addition to the heavy-duty mixer 11 units of a solution of ammonium zirconyl carbonate containing 2.2 dry units and the free water adjusted accordingly so that the final precent solids of the coating composition, as determined, was 62.5.

Another segment of the same coating base stock was then coated on the same roll coating machine as described in Example 1 at the same speed of 700 feet per minute apply the same coating weight, namely, 9 lbs., dry weight, per TAPPI ream (25" x 38"/500). After supercalendering a high-quality coated paper was produced, the characteristics of which were determined to be:

G.E. brightness—79.0
Gloss—86.6%
Wet-rub—Oven-cured 5 minutes at 200° F., good; 9 days' aging at room temperature only, good As may be deduced from a description of the comparative results, the sole difference between the operations of Example 1 and Example 2 is that a good degree of insolubilization of the coating was produced in Example 2 by the incorporation of ammonium zirconyl as a component of the coating composition employed therein. The full significance of my invention can only be appreciated by an examination of the rheograms from each coating, such an examination showing that the inclusion of the insolubilizing agent in the coating composition of Example 2 has not harmed in any manner the desirable rheological characteristics of the Standard or Blank coating composition of Example 1 but has served solely to impart in a practical operation the much sought-after good wet-rub characteristics desirable but heretofore unattainable in a pigmented starch paper coating to be applied at a solids level exceeding 60% on existing coating equipment, and more particularly, in an on-the-paper machine coating operation.

EXAMPLE 3

Step 1.—22 units of an unmodified pearl corn starch were wetted with 44 units of water and enzyme converted in the usual manner to yield a thin flowing solution of the starch.

Step 2.—To the solution of Step 1 there was added with agitation 22.0 units of a solution of ammonium zirconyl carbonate containing 4.4 dry units.

Step 3.—100 units of a fine particle coating clay bearing 0.3 unit diammonium acid phosphate as dispersing agent were then mixed, stepwise, in a heavy-duty mixer with the dispersion of Step 2 and also with 19.2 units of water to provide a finished smooth coating composition whose actual solid matter content was determined to be 61.0 percent.

Step 4.—The coating composition of Step 3 was then applied at a dry weight of 8 lbs. per ream to the same coating raw stock and under exactly the same conditions as previously described in Examples 1 and 2.

After supercalendering a high-quality coated paper was produced, the characteristics of which were determined to be:

G.E. brightness—79.6
Gloss—82.9%
Wet-rub—Oven-cured 5 minutes at 200° F., good; 9 days' aging at room temperature only, good This example demonstrates the utility of my invention in producing a good degree of insolubility in a high-solids, pigmented starch paper coating containing starch as the sole adhesive in a practical and inexpensive manner.

The following Examples 4 and 5 are typical of the so-called "low-solids" coating formulations and are useful both in size press coating on-the-paper machine and in various off-the-machine coating methods, such as air knife and squeeze roll coaters.

EXAMPLE 4

Step 1.—18 units of a hydroxylethyl ether derivative of corn starch were wetted with 42 units of water and the temperature brought to 190° F. and maintained at 180° F.–190° F. for a period of 15 minutes to yield a thin flowing solution of the starch.

Step 2.—To the solution of Step 1 there was added, with agitation, 22 units of a solution of ammonium zirconyl carbonate containing 4.4 dry units.

Step 3.—100 units of a fine particle domestic coating clay carrying no previously applied dispersing agent was then dispersed in sufficient water containing 0.3 unit of diammonium acid phosphate dispersing agent to yield a slurry of the clay containing 60% actual solids content.

Step 4.—The clay slurry of Step 3 was then added under moderate agitation with a paddle type mixer, to the dispersion of Step 2 and the whole mixture agitated for a period of one hour to provide a smooth, thin flowing coating composition of a type suitable for application at the size press of the paper machine and suitable for various types of off-the-machine coating operations. This coating contained 43.5% solids.

Step 5.—The coating composition of Step 4 was then applied via a pair of squeeze rolls at various dry coating weights to a series of base stocks including the 47 lb. raw stock of Example 1, a 56 lb. prime-coated base stock, and a 200 lb. book-lined cylinder board.

Accelerated aging tests consisting of 5 minutes curing in an oven at 200° F. produced a wet-rub rating of good to excellent for all of the coated specimens. In addition, a natural aging test embracing 15 days at room temperature only, yielded a wet-rub rating of good to excellent for duplicate samples of the coated specimens. In contrast, a Blank coating identical to the above coating formulation except that the ammonium zirconyl carbonate was omitted gave wet-rub ratings of very poor regardless of the manner or degree of curing.

EXAMPLE 5

The procedure described in the foregoing Example 4 was repeated excepting only that an enzyme converted starch was employed at a level of 30 units per 100 units of clay and the amount of ammonium zirconyl carbonate solution employed was 33 units, containing 6.6 dry units. This coating was thin flowing and contained 42% actual solids.

The oven-cured coated specimens resulting from application of this coating composition received a wet-rub rating of superior while those aged at room temperature received a wet-rub rating of excellent.

EXAMPLE 6

Step 1.—18 units of an unmodified pearl corn starch were wetted with 262 units of water and the temperature brought to 185° F. and maintained at 185° F. for a period of 30 minutes to yield a thick but flowable solution of the starch.

Step 2.—To the solution of Step 1 there was added, with agitation, 20 units of a solution of ammonium zirconyl carbonate containing 4.0 dry units.

Step 3.—100 units of a fine particle domestic coating clay carrying no previously applied dispersing agent was then dispersed in sufficient water containing 0.3 unit of diammonium acid phosphate dispersing agent to yield a slurry of the clay containing 60% actual solids content.

Step 4.—The solution of Step 2 was then added, under moderate agitation with a paddle type mixer, to the dispersion of Step 3 and the whole mixture agitated for a period of one hour to provide a smooth coating composition of a type suitable for application at the size press of the paper machine. This coating contained 26.2% solids.

Step 5.—The coating composition of Step 4 was then applied via a pair of squeeze rolls at various dry coating weights to the base stock of Example 1 and to a 200 lb. book-lined cylinder board.

Accelerated aging tests consisting of 5 minutes curing in an oven at 200° F. produced a wet-rub rating of good for all of the coated specimens. In addition, a natural aging test, embracing 15 days at room temperature only, yielded a wet-rub rating of good for duplicate samples of the coated specimens. In contrast, a Blank coating identical to the above coating formulation except that the ammonium zirconyl carbonate solution was omitted gave wet-rub ratings of very poor regardless of the manner or degree of curing.

EXAMPLE 7

Whereas Examples 4 and 5 provided descriptions of the utility of my invention in the so-called low-level or normal adhesive level, low-solids coating compositions, I wish also to provide a working example of a so-called high-level adhesive coating composition suitable for special prime-coating operations where it is desired to effectively seal the fibrous raw stock or to provide what is known in the art as "good coating hold-up" for a top coat subsequently to be applied. A preferred embodiment of this type is an application of such a coating at the size press of a paper machine producing food board, the top coating being then applied by a trailing blade coater.

Step 1.—100 units of an unmodified pearl corn starch were wetted with 233 units of water and enzyme converted in the usual manner to yield a thin flowing solution of the starch.

Step 2.—To the solution of Step 1 there was added, with agitation, 112 units of a solution of ammonium zirconyl carbonate containing 22.4 dry units.

Step 3.—100 units of a fine particle domestic coating clay carrying no previously applied dispersing agent was then dispersed in sufficient water containing 0.3 unit of diammonium acid phosphate dispersing agent to yield a slurry of the clay containing 50% actual solids.

Step 4.—The clay slurry of Step 3 was then added, under moderate agitation with a paddle type mixer, to the dispersion of Step 2 and the whole mixture agitated slowly for a period of one hour, after addition of sufficient water to reduce the final solids content to 23%, to provide a smooth coating composition of a type suitable for application at the size press of a paper machine.

Step 5.—The coating composition of Step 4 was applied through means of a laboratory size press to various raw stocks at dry coating weights in the range of 4 to 6 lbs. added per side.

Upon either accelerated aging for 5 minutes at 200° F. or natural aging for 15 days at room temperature, a condition of absolute insolubilization (scrub proofness) was attained. It will thus be apparent to those skilled in the art that lesser amounts of the insolubilizing agent may be advantageously employed where conditions of insolubility less than that described will suffice.

EXAMPLE 8

Step 1.—A book-lined, four-ply cylinder board of about 200 lbs. per ream (25" x 38"/500) basis weight was coated on one side at about 15 lbs. dry weight per ream with a composition consisting essentially of 100 units of fine particle coating clay and 25 units of starch adhesive (enzyme converted), the coating composition containing about 40% of nonvolatile solids and 60% of water.

Step 2.—After partial drying, but still being in a moist state, the so-coated board was led around a backing roll so that the freshly-coated but partially-set surface was immersed momentarily in an aqueous bath containing 20% ammonium zirconyl carbonate.

Step 3.—After emergence from the insolubilizing bath the now gelled coated surface and board base was led through a pair of rubber squeeze rolls to remove excess entrained liquid from the bath.

Step 4.—The so-treated moist coated board was dried in an oven until dry at which time it was determined that a high degree of insolubility had been produced in the coated surface of the coated cylinder board.

In the area of laminating and corrugating adhesives based upon starch a considerable number of opportunities exist for the advantageous application of my invention. Here, however, as in the field of high solids on-the-machine coating of paper, there are so many mechanical limitations and so many limiting relationships of speed versus viscosity versus thickness of film imposed by the operating characteristics of the machinery that the exact formulation is better left to the judgment of the operator of the particular process. Nevertheless, an example will be given to demonstrate the advantageous employment of my invention in this field.

EXAMPLE 9

A solution containing 33% by weight of an enzyme modified thin boiling starch, suitable for laminations such as seam-pasting of multi wall bags was prepared, in the usual manner by enzyme conversion, before cooling to 90° F. This solution was then divided into two equal parts, to one part of which was added sufficient ammonium zirconyl carbonate solution to yield a mixture containing 20% of dry ammonium zirconyl carbonate solids based upon the dry weight of the starch contained therein.

In separate experiments, each of the above solutions or mixtures was applied by means of a rubber squeeze roll nip to one side of a four-ply, book-lined cylinder board of approximately 200 lbs. basis weight per ream (25″ x 38″/500)

after which each specimen so treated so brought into contact at the wet film surface with another specimen of the dry board and the assembly laminated together by passage through a laminating nip. After drying briefly in the oven the laminated specimens were allowed to stand at room temperature for one day, after which the specimens laminated with the untreated starch and the insolubilized starch were both immersed in cold water for a period of 24 hours. At the end of this period the specimens were removed from the cold water and while still soaking wet were pulled apart. In every instance, the laminated assemblies which had employed the untreated starch as the adhesive pulled apart cleanly and easily at the adhesive line, indicating the lack of resistance of this film to the deleterious action of water. Quite in contrast, the laminated assemblies containing as adhesive the same starch but which had been treated with ammonium zirconyl carbonate prior to its application gave no failure at the adhesive line under forced separation while wet, but rather the failure occurred uniformly within the fibers themselves, thus indicating the superior water-resistant properties of this mixture when employed in a laminating operation.

I claim:

1. A coating composition consisting essentially of a cooked starch which is free of carboxyl groups as an adhesive, an inorganic pigment, water, and a water soluble zirconium salt capable of forming a preferred coordinate covalent bonds with the free electron pairs of the oxygen atoms of the starch hydroxyl groups.

2. A coating composition consisting essentially of a cooked starch which is free of carboxyl groups as an adhesive, an inorganic pigment, water, in sufficient amount to form a composition of coatable consistency and an amount of a water soluble zirconium salt equal to between about one and thirty parts per one hundred parts of starch on a dry basis, said composition containing less than about 55% by weight solids, said zirconium salt capable of forming a preferred coordinate covalent bonds with the free electron pairs of the oxygen atoms of the starch hydroxyl groups.

3. A coating composition in which the solids content is in excess of about 55% consisting essentially of an inorganic pigment, sufficient cooked starch which is free of carboxyl groups, as an adhesive to provide proper binding characteristics, water sufficient to provide a composition of coatable consistency and an amount of ammonium zirconyl carbonate equal to between about one and thirty parts per one hundred parts of starch on a dry basis.

4. The coating composition of claim 1 in which the starch is enzyme converted.

5. The process of forming an insolubilized starch coating on paper which comprises coating the paper with a coating composition consisting essentially of water, cooked starch which is free of carboxyl groups, and inorganic pigment, at least partially drying the coating, immersing the coating in an aqueous bath containing a sufficient amount of water soluble zirconium salt to render the starch coating insoluble, and drying the starch coating said zirconium salt capable of forming a preferred coordinate covalent bonds with the free electron pairs of the oxygen atoms of the starch hydroxyl groups.

6. Paper having adhered thereto a coating consisting essentially of insolubilized cooked starch which is free of carboxyl groups and a sufficient amount of a water soluble zirconium salt to effect said insolubilization, and in which the electron pairs of the oxygen atom of the starch hydroxyl groups form coordinate covalent bonds with the zirconium atom of the zirconium salt.

7. The paper of claim 6 in which the zirconium salt is ammonium zirconyl carbonate.

8. A laminated product comprising at least two layers of paper adhered together by at least one layer of an insolubilized cooked starch which is free of carboxyl groups, as an adhesive, and a sufficient amount of a water soluble zirconium salt to effect said insolubilization and in which the electron pairs of the oxygen atom of the starch hydroxyl groups form coordinate covalent bonds with the zirconium atom of the zirconium salt.

9. The laminated paper of claim 8 in which the zirconium salt is ammonium zirconyl carbonate.

References Cited

UNITED STATES PATENTS

| 2,824,037 | 2/1958 | King | 161—266 X |
| 3,137,588 | 6/1964 | Taylor | 106—213 X |
| 3,242,028 | 3/1966 | Hart | 117—156 X |
| 3,311,492 | 3/1967 | Hart | 117—156 X |

OTHER REFERENCES

Frost et al.: "Starch and Starch Products in Paper Coating," 1957, pp. 140–141, Tappi Monograph Series No. 17.

JULIUS FROME, *Primary Examiner.*

T. MORRIS, *Assistant Examiner.*

U.S. Cl. X.R.

106—214; 117—62.2, 156